US 9,695,951 B2

(12) United States Patent
Rodegheri et al.

(10) Patent No.: US 9,695,951 B2
(45) Date of Patent: Jul. 4, 2017

(54) SLIDE VALVE

(71) Applicant: Buerkert Werke GmbH, Ingelfingen (DE)

(72) Inventors: Cricia de Carvalho Rodegheri, Mainz (DE); Peter Krippner, Karlsruhe (DE); Stefan Seelecke, Saarbruecken (DE)

(73) Assignee: Buerkert Werke GmbH, Ingelfingen (DE)

( * ) Notice: Subject to any disclaimer, the term of this patent is extended or adjusted under 35 U.S.C. 154(b) by 1 day.

(21) Appl. No.: 14/716,416

(22) Filed: May 19, 2015

(65) Prior Publication Data

US 2015/0369381 A1    Dec. 24, 2015

(30) Foreign Application Priority Data

Jun. 20, 2014  (DE) .................. 10 2014 108 678

(51) Int. Cl.
| F16K 11/065 | (2006.01) |
| F16K 11/07 | (2006.01) |
| F16K 31/02 | (2006.01) |
| F16K 31/00 | (2006.01) |

(52) U.S. Cl.
CPC .......... F16K 11/07 (2013.01); F16K 31/008 (2013.01); F16K 31/02 (2013.01); *Y10T 137/86863* (2015.04); *Y10T 137/86879* (2015.04)

(58) Field of Classification Search
USPC ............. 137/454.6, 625.69; 251/129.06, 318
See application file for complete search history.

(56) References Cited

U.S. PATENT DOCUMENTS

| 4,587,991 | A | * | 5/1986 | Chorkey | ............ | F15B 13/0402 |
| | | | | | | 137/454.6 |
| 7,971,850 | B2 | * | 7/2011 | Heim | .................. | F16K 99/0001 |
| | | | | | | 239/597 |
| 8,585,007 | B2 | * | 11/2013 | Schapeler | ............ | F16K 31/404 |
| | | | | | | 251/129.06 |
| 9,231,186 | B2 | * | 1/2016 | Busgen | .................... | F15D 1/12 |
| 2008/0185541 | A1 | * | 8/2008 | Ukpai | .................. | F16K 31/025 |
| | | | | | | 251/11 |
| 2012/0048398 | A1 | * | 3/2012 | Schudt | ................ | F16K 31/0613 |
| | | | | | | 137/514 |

FOREIGN PATENT DOCUMENTS

| DE | 102012215548 | 3/2014 |
| EP | 2110590 | 10/2009 |

OTHER PUBLICATIONS

Search Report issued Mar. 10, 2015 by the German Patent and Trademark Office for German Patent Application No. DE 10 2014 108 678.3.

* cited by examiner

*Primary Examiner* — John Fox
(74) *Attorney, Agent, or Firm* — Dilworth IP LLC

(57) ABSTRACT

A slide valve comprises a bushing in which fluid openings are provided which extend through the wall of the bushing, a slide which is arranged adjustably in the bushing and is provided with at least one fluid duct, and an electroactive polymer actuator which can adjust the slide in the bushing.

27 Claims, 9 Drawing Sheets

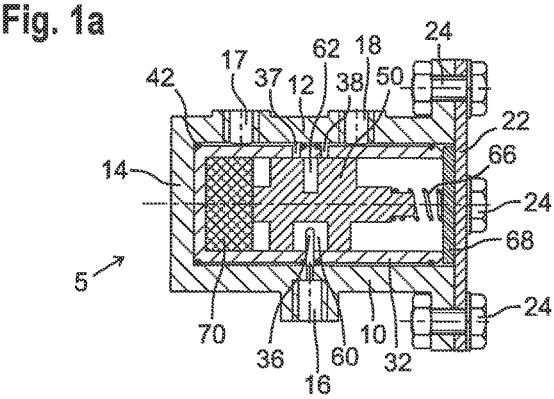
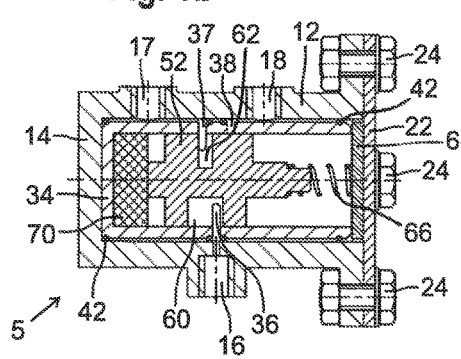
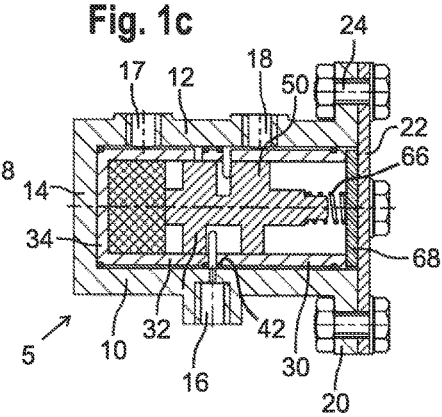

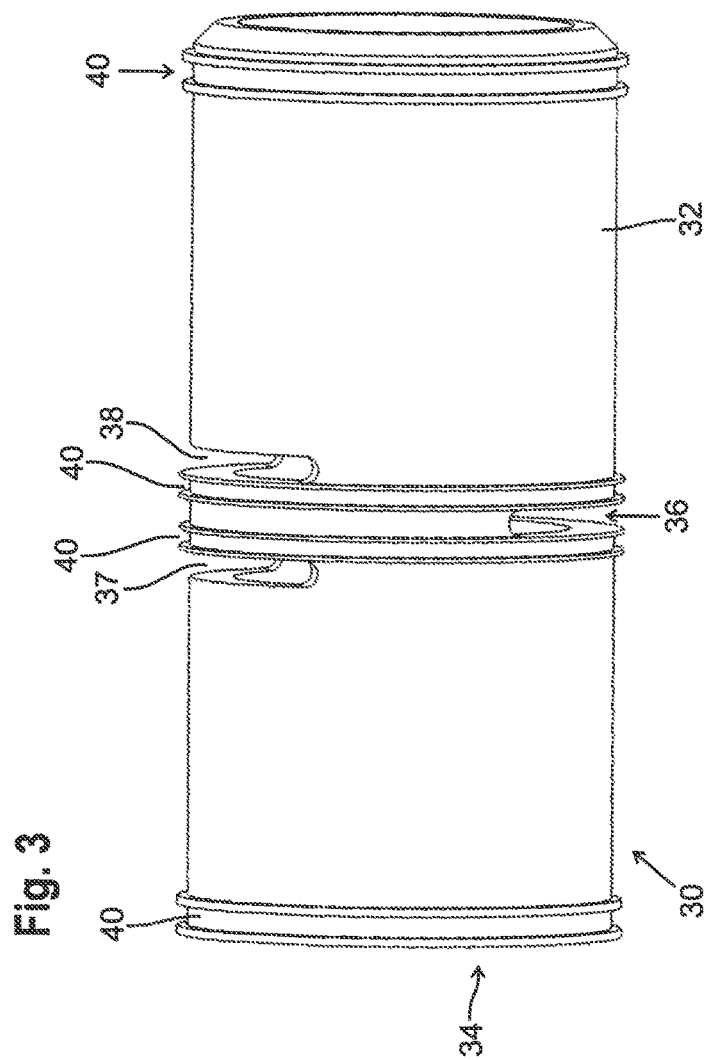

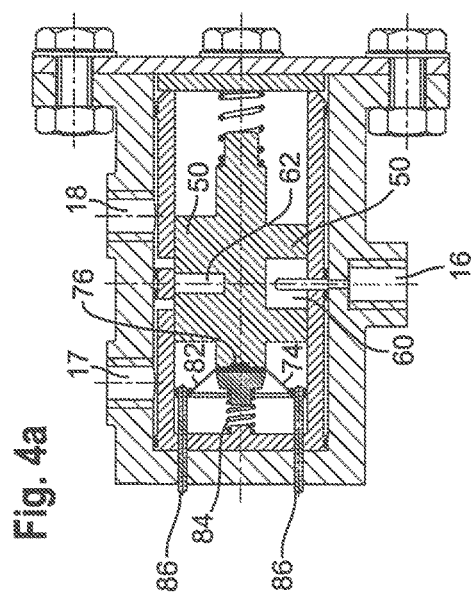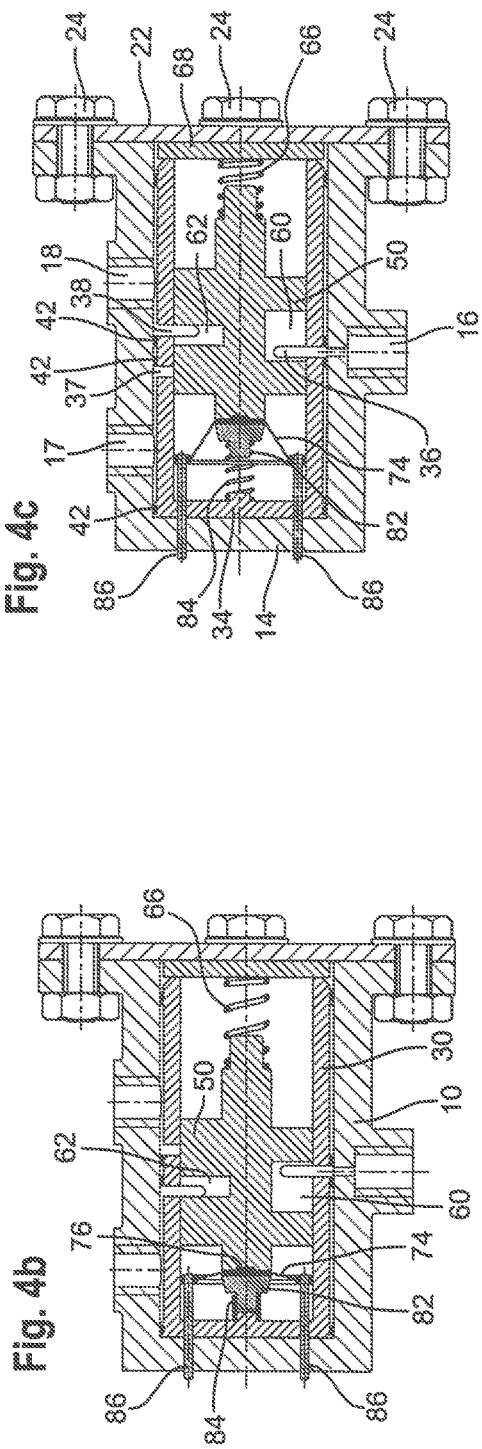

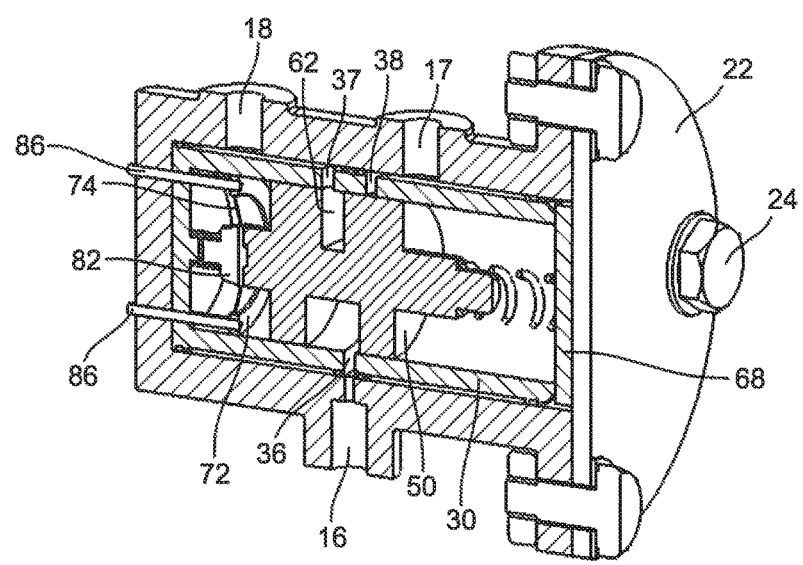

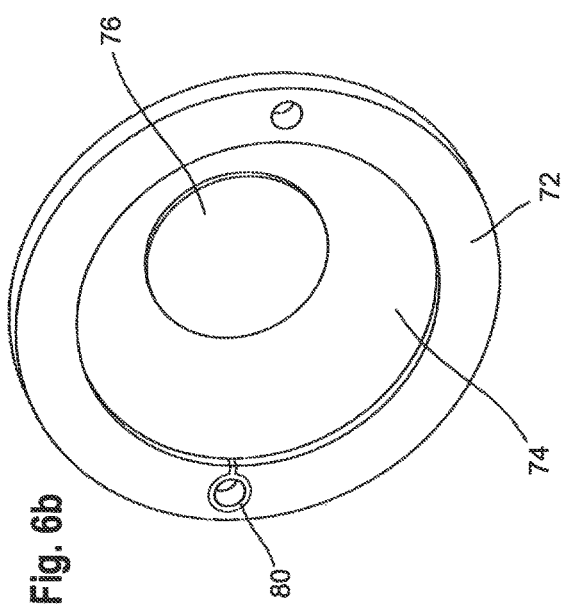
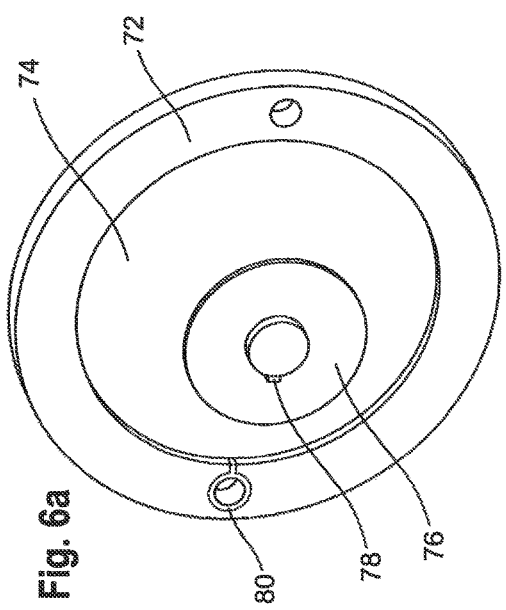
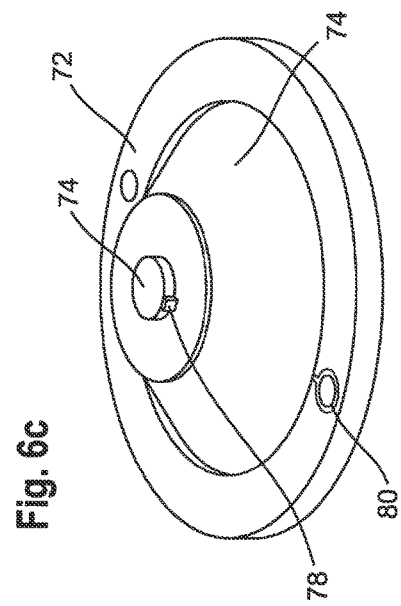

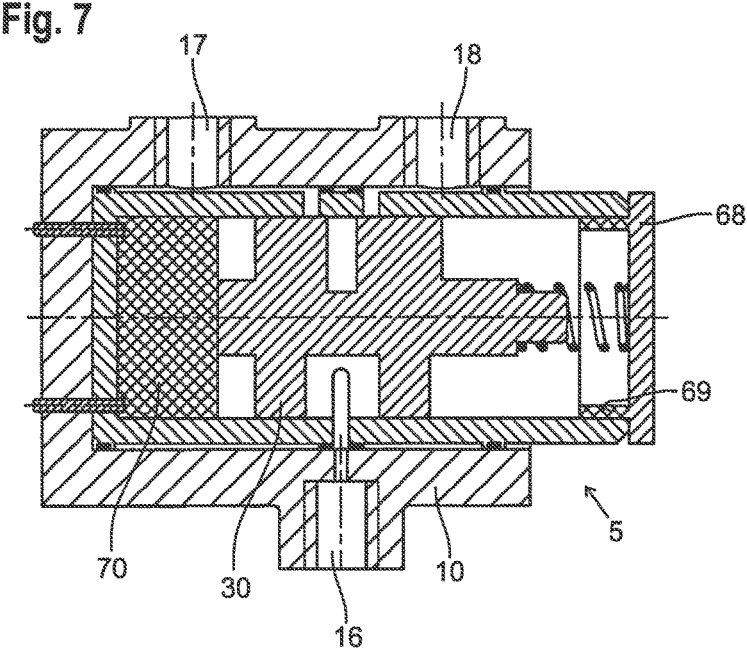

SLIDE VALVE

The invention relates to a slide valve, by means of which fluid flows can be controlled or switched.

BACKGROUND OF THE INVENTION

Slide valves are known in many constructions in the art. They are distinguished in that smaller forces are required for actuating the valve side than in what are known as seat valves, in which a valve element cooperates with a valve seat. The lower forces in a slide valve basically result from the fact that the slide is adjusted perpendicular to the flow direction of the controlled fluid, and therefore, ignoring friction, the pressure of the controlled fluid has a much smaller effect on the required adjusting force.

A problem with conventional slide valves is that the valve drive used generally consumes energy even when stationary. For example, the coil of an electromagnetic valve drive has to be excited continuously during the operation of the slide valve so as to hold the slide in the desired position.

A further problem which occurs in slide valves is the required installation space. In particular, if there is an electromagnetic drive, it is scarcely possible to make it more compact.

Very recently, attempts have also been made at using piezoelectric valve drives. However, drives of this type are very complex (for example because of a required stroke transmission) if they are able to produce a sufficiently large adjustment distance, such as is required for a slide valve.

The object of the invention is to provide a slide valve by means of which a fluid or a plurality of fluids can be controlled with direct electrical actuation, at minimal energy consumption, with as little pressure loss as possible. Further, it should be possible to adjust the slide proportionally without the valve drive consuming energy when stationary.

SHORT DESCRIPTION OF THE INVENTION

According to the invention, to achieve this object, a slide valve is provided comprising a bushing in which fluid openings are provided, the openings extending through the wall of the bushing. The valve further comprises a slide which is arranged adjustably in the bushing and is provided with at least one fluid duct. Further, the valve comprises an electroactive polymer actuator which can adjust the slide in the bushing. The invention is based on the underlying idea of using, for the valve drive, the properties of various polymers whereby they deform when an electric voltage is applied thereto. The deformation is used for adjusting the valve, in such a way that the fluid can subsequently be switched directly. As a result, either a fluid can be switched, for example in a 2/2-way or a 3/3-way valve, or else a plurality of fluids can be switched, for example in a 5/3-way valve. Very little energy is required for adjusting the slide, since a polymer actuator is highly efficient. Moreover (ignoring leakage currents) there is no need to supply energy when the polymer actuator is stationery. A further advantage is that a proportional valve can be implemented using a polymer actuator. Finally, it is also advantageous that the polymer actuator does not contain any ferromagnetic materials, and so the slide valve driven thereby can be used even in high-field magnetic applications, for example in an MRT.

One embodiment of the invention provides that the polymer actuator is arranged inside the bushing on an axial face of the slide. This results in a compact construction, in which the polymer actuator can act directly on the slide.

Preferably, it is provided that a spring acting in the axial direction of the slide is assigned to the polymer actuator. Depending on the construction of the polymer actuator, the spring is important for correct operation, since the actuator sometimes needs to be biased. The spring may also be integrated into the polymer actuator.

As an alternative to a spring, an air cushion which provides the desired restoring forces may also be used.

A second spring may be arranged on the face of the slide opposing the polymer actuator. This cooperates appropriately with the first spring in such a way that a desired valve characteristic can be set. However, in principle a single spring is sufficient.

Depending on the desired characteristic of the slide valve, the spring (or the springs combined) may have a linear characteristic. Alternatively, a non-linear characteristic is also possible. Overall, the characteristic of the valve can be set by suitably selecting the spring(s) used, as well as the polymer actuator, in the desired manner.

One embodiment of the invention provides that a second polymer actuator is arranged on the face of the slide opposing the polymer actuator. A second polymer actuator which acts counter to the first polymer actuator is advantageous in particular if a particularly high operating frequency of the slide valve is desired.

In one embodiment of the invention, the polymer actuator may be a stack actuator. In this, actuator, the desired ratio of stroke to adjusting force can be achieved by suitably coating the individual actuator elements.

An alternative embodiment provides that the polymer actuator is a membrane actuator. This is distinguished by a simpler construction.

One embodiment provides that the polymer actuator is contacted via an electrically conductive adhesive connection. In this way, electrodes on the rear face of the polymer actuator can be contacted directly via housing openings.

It may also be provided that the polymer actuator is contacted via contact pins. These may for example be provided in the housing base, the electrodes of the polymer actuator being pressed against the contact pins during assembly in such a way that the contacting takes place.

One embodiment of the invention provides that the polymer actuator is centred and contacted by a plurality of contact rings. The contact rings have a dual purpose, specifically both electric contacting of the various layers of the polymer actuator, if it is a stack actuator formed from a plurality of actuator membranes, and mechanical centring within the bushing.

A guide may also be provided which ensures a predetermined gap between the polymer actuator and the bushing, ensuring movability of the actuator. The guide is preferably resilient.

In a preferred embodiment of the invention, the slide is a cylinder. This makes it possible to arrange the slide suitably sealed within the bushing in a comparatively simple manner.

One embodiment of the invention provides that in a portion assigned to one of the fluid openings, the fluid duct is of a width in the axial direction which is smaller than the width of the fluid duct in a portion assigned to another fluid opening. The wider portion of the fluid duct is connected to the fluid opening assigned to the wide portion at all times, independently of the position of the slide, whereas the connection between the narrower portion and the fluid opening assigned thereto depends on the position of the slide.

Preferably, anti-twist protection is provided, which ensures that the slide can twist through at most a predetermined angle in the bushing. In an asymmetrically formed slide, the anti-twist protection is important for ensuring that the assignment of the various portions of the fluid opening of the slide to the corresponding fluid openings of the bushing is maintained.

A preferred embodiment provides that the anti-twist protection is achieved by way of rotational engagement between the slide and the polymer actuator. In this embodiment, no separate anti-twist protection is required; instead, the slide is suitably attached to the polymer actuator, which in turn is received rotationally engaged in the bushing as a result of the required contacting.

One embodiment of the invention provides that the slide comprises a control portion, which is provided with a fluid duct and the external diameter of which substantially corresponds to the internal diameter of the bushing, and an actuator projection, which has a much smaller diameter than the control portion. By using this embodiment, on the one hand material can be saved in the slide, and this results in a low weight and thus a short response time. Further, in this way a sufficiently large free volume can be provided around the actuator projection so that the space in which the polymer actuator is located need not necessarily be provided with suitable ventilation which makes it possible for the volume displaced by the adjustment of the slide to escape from the space inside the bushing in which the polymer actuator is arranged.

One embodiment provides that a bracing disc is provided on the actuator projection. This makes it possible in particular for a stack actuator to be braced on the slide over a large area.

One embodiment provides that the slide is provided, on the face remote from the actuator projection, with a spring projection which is of a much smaller diameter than the control portion. The spring portion can be used to receive a spring which is arranged on the face of the slide remote from the polymer actuator. Further, the spring projection brings about the same advantages, as regards weight and absence of ventilation, as were discussed above for the actuator projection.

One embodiment of the invention provides that the bushing is provided, on the peripheral face thereof, with at least one recess for an O ring. The O ring makes it possible, in a simple manner, to seal the bushing appropriately within a housing in which it is received. In particular, a plurality of O rings are appropriately arranged in such a way that the bushing is sealed off between the various fluid openings.

One embodiment of the invention provides that the fluid openings are slits extending in the peripheral direction. In this way, a comparatively large flow cross section switched by the slide can be achieved.

Preferably, all of the components of the slide valve are non-ferromagnetic. This makes it possible to use the slide valve in high-field magnetic applications.

In one embodiment of the invention, the bushing comprises a base formed integrally with the peripheral wall. In this way, a type of cup is produced, in which for example initially the polymer actuator and then the slide and subsequently a spring or else a second polymer actuator may be assembled.

Preferably, the bushing is sealed by an end wall. The end wall simultaneously provides bracing for the spring which opposes the polymer actuator, or for the second polymer actuator arranged there. The end wall further provides that the bushing is tightly sealed.

One embodiment of the invention provides that the bushing is inserted into a housing which is provided with fluid connections. This makes it possible to preassemble the bushing together with the polymer actuator and the slide as a valve cartridge, which can subsequently be inserted into a suitable housing depending on the application. In a valve cartridge of this type, the end wall is preferably rigidly connected to the bushing, for example screwed on, in such a way that an intrinsically sealed, standardised slide valve assembly is formed, which can be inserted into various housings.

Preferably, the housing comprises a cover by means of which the bushing is braced inside the housing. This embodiment is distinguished by simple assembly. Further, if required, the bushing may be replaced together with the polymer actuator and the slide in a simple manner.

A preferred embodiment of the invention provides that the polymer actuator is a dielectric elastomer actuator (DEA). Actuators of this type are distinguished by high reliability and precise assignment of the adjustment path to the applied voltage. Further advantages are a large possible stroke, high energy density, low power consumption, simple construction and low costs.

The slide valve may for example be a 3/3-way valve or a 5/3-way valve. In principle, all other valve types which it has been possible to implement using a slide valve thus far are also possible.

SHORT DESCRIPTION OF THE DRAWINGS

In the following, the invention is disclosed by way of various embodiments, which are shown in the accompanying drawings, in which:

FIGS. 1a, 1b and 1c schematically show a slide valve according to the invention in a central position, a first switched position and a second switched position.

FIG. 3 is a perspective view of the bushing used in the slide valve of FIG. 1;

FIGS. 4a, 4b and 4c show a slide valve according to the invention comprising a polymer actuator of a first embodiment in a central position, a first switched position and a second switched position;

FIG. 5 is a perspective, longitudinally sectioned view of the slide valve of FIG. 4;

FIGS. 6a, 6b and 6c are a perspective plan view, a perspective view from below and a perspective side view of the polymer actuator used in the slide valve of FIG. 4;

FIG. 7 shows a variant configuration of a slide valve according to the invention;

DETAILED DESCRIPTION OF THE INVENTION

Figure 2:
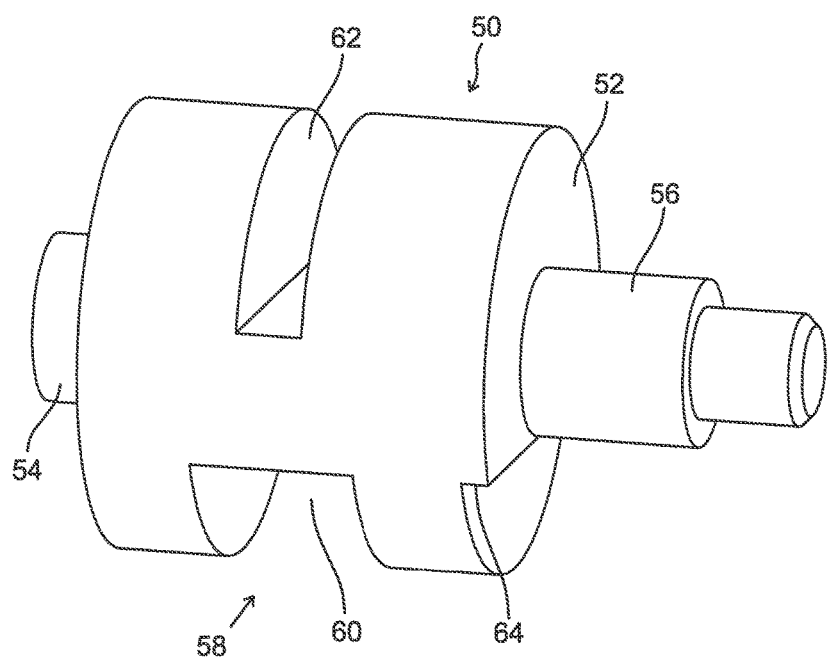
FIG. 2 is a perspective view of the slide used in the slide valve of FIG. 1.

In the following, the basic construction of a slide valve according to the invention is disclosed by way of FIGS. 1 to 3. This is a 3/3-way valve. However, other types can be implemented by slightly modifying the valve.

As essential components, the slide valve 5 comprises a housing 10, a bushing 30, a slide 50 and a polymer actuator 70. Generally speaking, the slide 50 serves to interrupt a fluid connection between various fluid openings in the bushing 30 depending on the position thereof or to produce a larger or smaller flow cross section. The slide 50 is adjusted by the polymer actuator 70.

The housing 10 is cylindrical in form, comprising a peripheral wall 12 and a base 14. In the peripheral wall 12, in this case three fluid connections are provided through which fluid can pass into the interior of the housing 10. For better comprehension, these terminals are denoted as the first fluid terminal 16, second fluid terminal 17 and third fluid terminal 18.

On the face remote from the base 14, the housing 10 is provided with a flange 20, to which a housing cover 22 is attached via a plurality of fixing screws 24.

The bushing 30, which comprises a cylindrical bushing peripheral wall 32 and comprises a bushing base 34 at one axial end, is arranged inside the housing 10. Three fluid openings 36, 37, 38 are provided in the bushing peripheral wall 32, and in this case are in this case in the form of slits extending in the peripheral direction over an angular range much greater than that of a simple hole.

In the embodiment shown, the fluid openings 36, 37, 38 extend over an angular range of approximately 90°. The length of each fluid open 36, 37, 38 measured in the peripheral direction is thus many times greater than the width thereof measured in the axial direction.

On the outer face thereof, the bushing 30 is provided with a plurality of recesses 40, in each of which an O ring 42 is arranged. The recesses 40 are positioned in such a way that in each case a space precisely assigned to one of the fluid openings 36, 37, 38 is defined between them.

As can be seen in particular in FIG. 3, the fluid opening 37 is located between the left recess 40 and the left of the two central recesses 40, whilst the fluid opening 36 is arranged between the two central recesses 4. Finally, the fluid opening 38 is arranged between the right of the two central recesses 40 and the right recess 40.

When the bushing 30 is inserted into the housing 10, the O rings 42 are located at a position, in the axial direction with respect to the fluid terminals 16, 17, 18, such that each of the fluid terminals 16, 17, 18 is connected to exactly one of the fluid openings 36, 37, 38 in a sealed manner.

The fluid terminal 16 is located centrally between the O rings 42 of the two central recesses 40, in such a way that it is tightly connected to the first fluid opening 36. The second fluid terminal 17 is located between the O ring 42 of the left recess and the O ring of the left of the two central recesses 40, and thus in a tight fluid connection with the second fluid opening 37. The third fluid terminal 18 is accordingly in a tight connection with the third fluid opening 38. Thus, fluid which is supplied or removed via one of the fluid terminals 16, 17, 18 is supplied to or removed via precisely the fluid opening 36, 37, 38 of the bushing assigned to this terminal.

The slide 60 is cylindrical in form, and comprises a control portion 52 of which the external diameter corresponds to the internal diameter of the bushing 30. In this context, "adapted" means that the slide 50 is displaceable inside the bushing 30 in the axial direction, but is received in the bushing in a fluid-tight manner.

Two projections, which each have a diameter much smaller than the diameter of the control portion 52, are arranged on the two mutually remote end faces of the control portion 52. An actuator 54 is provided on one face and a spring projection 56 is arranged on the opposite face. As can be seen in drawings, the diameter of these two projections is approximately a third of the diameter of the control portion 52.

The control portion 52 of the slide 50 is provided with a fluid duct 58, the purpose of which is to connect the fluid opening 36 to one of the fluid openings 37, 38.

In this case, the fluid duct 58 in the slide 50 has two portions, which are of different widths in the axial direction, specifically a first portion 60, assigned to the first fluid opening 36, and a second portion 62, assigned to the second and third fluid openings 37, 38 depending on the position of the slide 50.

The width of the first portion 60 of the fluid duct 58, measured in the axial direction, is such that the first fluid opening 36 is always within the first portion 60. By contrast, the width of the second portion 62 is smaller than the distance between the second and the third fluid opening 37, 38. Thus, depending on the position of the slide 50, three states are possible: the second portion 62 may be positioned between these fluid openings 37, 38 and not be in a fluid connection with either of them; the second portion 62 may overlap with the second fluid opening 37 by a greater or smaller distance; and it may overlap with the third fluid opening 38 by a greater or smaller distance.

The first portion 60 and the second portion 62 of the fluid duct 58 are interconnected. For this purpose, either a central hole may be provided, or the two portions 60, 62 extend far enough in the peripheral direction, on the rear face (not visible in FIG. 2) of the slide 50, that they transition into one another.

On the face of the spring projection 56, the control portion 52 is provided with a shoulder 64, The purpose of the shoulder is to reduce the axial width of the wall of the slide; this leads to a smaller weight and a more rapid response of the valve.

The polymer actuator 70 is a dielectric polymer actuator, various embodiments of which are known in the art. Examples may be found in WO 2008/083325 A1. In principle, however, it is possible to use any polymer actuator which makes it possible to adjust the slide 50 inside the bushing 30 with the desired stroke and the desired switching speed.

The polymer actuator 70 is arranged between the base 34 of the bushing 30 and the actuator 54 of the slide 50 (see FIGS. 1a to 1c). It is rigidly connected both to the base 34 and to the actuator projection 54 in the axial direction.

The purpose of the polymer actuator 70 is to adjust the slide 50 inside the bushing 30 in the axial direction. In the variant of a 3/3-way valve shown here as an example embodiment, the polymer actuator 70 can adjust the slide 50 between a central position, shown in FIG. 1a, a first maximally switched position (see FIG. 1b), and a second maximally switched position (see FIG. 1c).

To ensure that the first portion 60 of the fluid duct 58 is always assigned to the first fluid opening 36 and the second portion 62, as considered in the peripheral direction, is assigned to the two fluid openings 37, 38, anti-twist protection is provided, which ensures that the slide 50 cannot twist in the peripheral direction. In this case, the anti-twist protection is implemented in that the actuator projection 54 of the slide 50 is rotationally engaged with the polymer actuator 70.

In each position of the slide valve 5, the first fluid opening 36 is positioned completely inside the first portion 60 of the fluid duct 58 of the slide 50.

In the central position of the slide 50 (see FIG. 1a), the second portion 62 is positioned between the two fluid openings 37, 38. Therefore, the fluid openings 37, 38 are sealed by the regions of the control portion 52 of the slide which are positioned either side of the first portion 62 of the fluid duct 58, in such a way that the two fluid openings 37, 38 are locked directly and the fluid opening 36 is locked indirectly.

In the first maximally switched position (see FIG. 1b), the slide 50 is displaced to the left from the central position in terms of FIG. 1a to 1c, in such a way that the second fluid opening 37 is positioned completely inside the second portion 62 of the fluid duct 58. Since the second portion 62 of the fluid duct 58 is connected to the first portion 60, which further overlaps with the first fluid opening 36, in this state the maximum flow cross section is opened between the first fluid opening 36 and the second fluid opening 37 (and thus between the first terminal 16 and the second terminal 17).

In the second maximally closed position of the valve, the slide 50 is displaced maximally to the right from the central position, in such a way that the fluid opening 38 is positioned completely inside the second portion 62 of the fluid duct 58. Thus, the maximum flow cross section is opened between the first fluid opening 36 and the third fluid opening 38.

The polymer actuator 70 is configured in such a way that it can adjust the slide 50 continuously inside the bushing 30. In this way, the fluid openings 37, 38 can be opened more or less as a function of a control signal. As a result, it is possible in particular for the slide valve 5 to work as a proportional valve.

A spring 66, which is braced on an end wall 68 which is in turn braced on the housing cover 22, is arranged on the spring projection 56 of the slide 50. In this case, the spring 66 has the purpose of selling the control properties of the slide valve 5 in the desired manner. For example, a non-linear characteristic of the spring 66 can be superposed on an also non-linear characteristic of the polymer actuator 70, in such a way that ultimately a proportional characteristic of the slide valve 5 is achieved.

Instead of acting as a restoring spring, the spring 66 may also be used for biasing the polymer actuator 70. In this case, it is in the form of a tensile spring.

In principle, however, the slide valve 5 also works without the spring 66. In this case, the slide 50 is also formed without a spring projection 56.

It may also be provided that instead of the spring 66 a second polymer actuator is used, which acts counter to the polymer actuator 70. In this way, a shorter response time of the slide can be achieved.

In the following, a first embodiment of the polymer actuator 70 is disclosed by way of FIGS. 4 to 6. The slide valve 5 basically corresponds to the embodiment shown in FIGS. 1 to 3, and like reference numerals are used for the components known from this embodiment. All of the explanations regarding these components also apply to the slide valve of FIGS. 4 to 6.

In the embodiment of FIGS. 4 to 6, the polymer actuator 70 is a dielectric elastomer actuator, which in this case is in the form of a membrane actuator.

The dielectric polymer actuator is generally based on the application of a large-area electrode to each of two mutually opposing faces of a dielectric polymer film. When a sufficiently high electric voltage is applied to the electrodes, the electrodes attract one another, in such a way that the interposed film is compressed. Since the dielectric film used is virtually incompressible, the reduction in the distance between the electrodes leads to a change in shape. In a membrane, for example the central portion of a circular membrane may be deflected axially with respect to the outer edge when an electric voltage is applied to the electrodes on the two faces of the membrane; simply put, the reduction in the thickness of the dielectric film is converted into a greater axial length of the membrane.

The dielectric elastomer actuator 70 can be seen in FIGS. 6a to 6c. It comprises an outer ring 72, which is used for stationary attachment inside the bushing 30. The membrane 74 of a dielectric polymer film, which is covered with the electrode on both sides, is clamped in the outer ring 72. An attachment part 76 is arranged in the central portion, and is connected to the actuator projection 54 of the slide 50.

As can be seen in FIGS. 6a and 6c, a tab 78 is also formed there, which is used for rotational engagement with the actuator projection 54 and thus implements the anti-twist protection for the slide 50.

Further, on the outer ring 72, a terminal 80 is respectively provided on mutually opposing face, and is used in electrical connection with the electrode formed on the corresponding face of the membrane 74.

As can be seen in FIGS. 4 and 5, the outer ring 72 is mounted in the interior of the bushing 30, at a distance from the base 34. The attachment part 76 is rigidly attached to the actuator projection 54, A spring holder 82 is placed on the inner face of the attachment part 76, and receives a spring 84, which is braced on the base 34 of the bushing. The spring holder 82 may thus also be used as a spacer, which defines the position of the slide 50 maximally adjusted to the left.

For electrically contacting the electrodes of the membrane 74, two contact pins 86 are provided, which extend through the base 14 of the housing 10 and through the base 34 of the bushing 30 as far as the terminals 80 in the outer ring 72. The contact pins 86 may be inserted into corresponding openings in the housing 10 and the bushing 30, or else be moulded therein, for example injection-moulded. Needless to say, the contact pins 86 have to be insulated from one another in the region of the passage through the base 14, 34 to prevent a short circuit from occurring.

FIG. 4b shows the valve in a state in which no electric voltage is applied to the polymer actuator 70. The membrane 74 is thus in the "shortest" form thereof, and the spring 84 is maximally biased.

When an electric voltage is applied to the electrodes on the membrane 74 via the contact pins 86, the polymer film of the membrane 74 is compressed, causing it to lengthen under the action of the spring 84. Starting from the position shown in FIG. 4b, the spring 84 reaches the position shown in FIG. 4a under the action of the spring 84, or in other words is displaced to the right.

If from the position shown in FIG. 4a an even higher voltage is applied to the contact pins 86, the polymer film is compressed even further between the electrodes on opposing faces of the membrane 74, in such a way that the distance between the outer ring 72 of the polymer actuator 70 and the attachment part 76, measured in the axial direction, increases, and the slide 50 reaches the position shown in FIG. 4c under the action of the spring 84.

If the electric voltage is removed, the membrane is restored to the initial state. As a result, the spring 84 is compressed, and the slide is displaced to the left in terms of FIG. 4.

In the embodiment shown, the restoration of the slide is assisted by the spring 66. If no spring is used, the restoration takes place purely under the resilient action of the polymer actuator 70.

An essential feature of this polymer actuator is that no energy supply is required to keep it in a particular state. The applied electric voltage merely has to be kept unchanged. For this purpose, it is merely necessary to compensate any leakage currents.

FIG. 7 shows a variant configuration, which differs from the previous embodiments in that the slide valve is formed as a valve cartridge, in other words is intrinsically sealed. Accordingly, the end wall 68 is rigidly connected to the bushing, without the housing 10 being required for this purpose. In this case, the end wall is provided with a protuberance 69 which is screwed tightly into the bushing 30.

The valve cartridge thus formed can be provided in various sizes for different fluid flows to be switched, and subsequently inserted into an individual housing by the user. In this case, this is represented in that the hosing 10 is made shorter than in the previous embodiments. Accordingly, the right recess 40 is arranged with the right O ring 42 closer to the centre of the bushing 30.

Figure 8A:
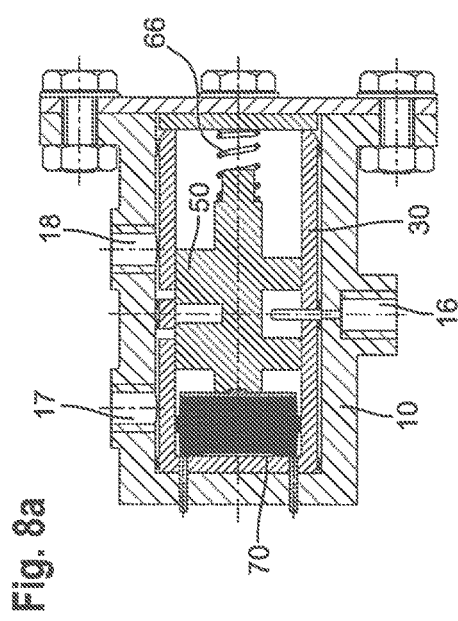
FIGS. 8a, 8b and 8c show a slide valve according to the invention comprising a polymer actuator of a second embodiment in a central position, a first switched position and a second switched position.
Figure 8C:
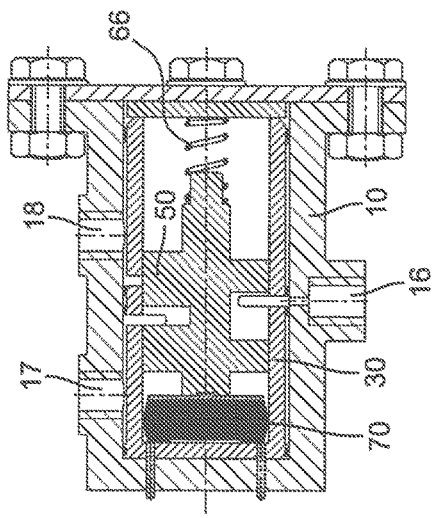
Figure 8B:
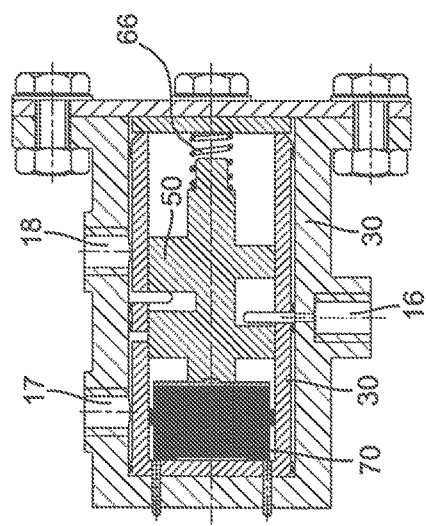
Figure 9B:
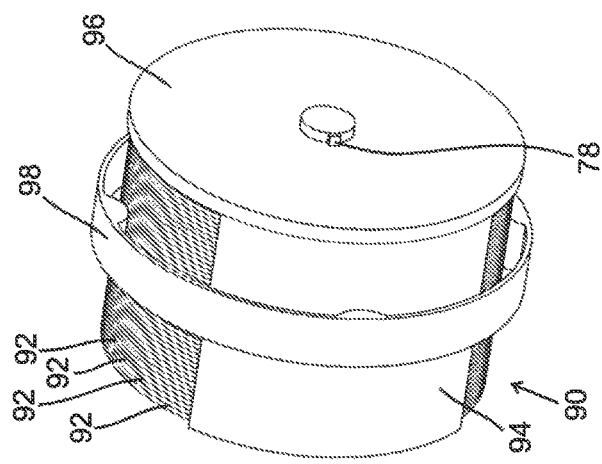
FIGS. 9a, 9b and 9c are perspective views of the polymer actuator of the slide valve of FIG. 8 in a central position, a first switched position and a second switched position.
Figure 9A:
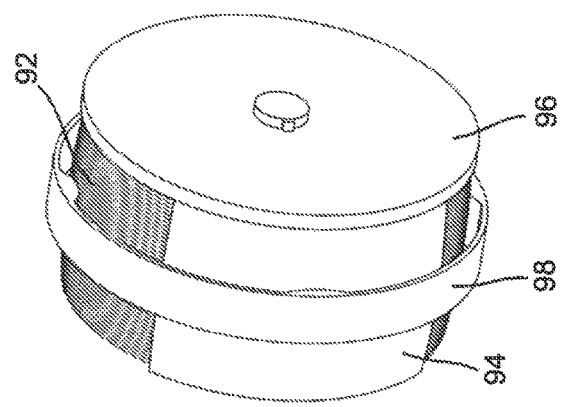
Figure 9C:
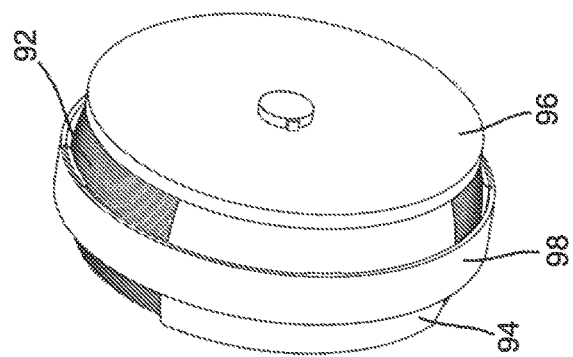

FIG. 8 to 9 show a second embodiment of the polymer actuator 70. Aside from the changes to the polymer actuator, the valve corresponds to the one known from FIGS. 1 to 6. Accordingly, the components known from these drawings are provided with like reference numerals, and reference is made to the relevant explanations.

The difference from the polymer actuator of the embodiment of FIGS. 4 to 65 is that a stack actuator is used in the embodiment of FIGS. 8 and 9. A stack actuator consists of a plurality of individual layers of dielectric polymer film, in such a way that a dielectric elastomer actuator is again formed. The electrodes on the mutually remote faces of each layer are mutually contacted, in such a way that an electric voltage can be applied between the electrodes on the mutually remote faces of a layer. Under the action of this voltage, the respective layer is compressed, some material being pressed outwards because of the incompressibility of the polymer material used. Overall, the axial height of the entire stack is reduced by the compression of the individual layers.

The stack actuator 90 consists of a plurality of individual membrane layers 92, which are stacked on top of one another and can be contacted individually. Electrodes are arranged between the layers 92 in each case and can be mutually contacted via contact elements 94. For example, the contact element 94 visible on the front face of the drawing in FIG. 9 contacts the electrodes 1, 3, 5, 7, whilst a second contact element 94 arranged on the rear face of the stack actuator 90 contacts the electrodes 2, 4, 6, 8.

The two contact elements 94 are guided on the face facing the base 34 of the bushing 30 as far as the lower face of the stack, where they can be contacted by the contact pins 86. An electrically conductive adhesive connection may be used for this purpose. A support washer 96 is provided on the opposing face and is rigidly connected to the actuator projection 54 of the slide 50.

A guide element 98 is provided around the stack actuator 90, and holds the stack actuator 90 at a defined distance from the inner wall of the bushing 30, in such a way that the stack actuator can be moved in the axial direction. The guide element 98 is itself resiliently deformable.

In FIG. 9b, the stack actuator is shown in the initial state, in other words when no electric voltage is applied. Each of the layers 92 is at the initial thickness thereof, in such a way that the stack actuator as a whole is at the maximum axial length thereof.

When an electric voltage is applied to the electrodes between the layers 92, the layers are compressed, reducing the thickness thereof. As a result, the axial height of the stack actuator 90 is also reduced, causing the slide 50 to be adjusted increasing to the left (see FIGS. 9b and 9c and equivalently the position of the slide 50 in FIGS. 8b and 8c) from the starting position shown in FIG. 9b (see position of the slide in FIG. 8b).

Even if the relative movement between the guide element 98 and the stack actuator 90 leads to slight wear on the outer face of the layers 92 in the long term, this is not critical, since the wear is limited locally, whilst the contact takes place over a large area.

The invention claimed is:

1. A slide valve comprising a bushing in which fluid openings are provided which extend through the wall of the bushing, inside which bushing are arranged a slide and an electroactive polymer actuator adapted for adjusting said slide, wherein said slide is arranged adjustably in said bushing and is provided with at least one fluid duct, and wherein said electroactive polymer actuator is arranged inside said bushing on an axial face of the slide, wherein said bushing is inserted into a housing which is provided with fluid terminals.

2. The slide valve of claim 1 wherein a spring acting in an axial direction of said slide is assigned to said polymer actuator.

3. The slide valve of claim 2 wherein a second spring is arranged on a face of said slide opposite said polymer actuator.

4. The slide valve of claim 2 wherein said spring has as linear characteristic.

5. The slide valve of claim 2 wherein said spring has a non-linear characteristic.

6. The slide valve of claim 1 wherein a second polymer actuator is arranged a face of said slide which is opposite said polymer actuator.

7. The slide valve of claim 1 wherein said polymer actuator is a stack actuator.

8. The slide valve of claim 1 wherein said polymer actuator is a membrane actuator.

9. The slide valve of claim 1 wherein said polymer actuator is contacted via an electrically conductive adhesive connection.

10. The slide valve of claim 1 wherein said polymer actuator is contacted via contact pins.

11. The slide valve of claim 1 wherein said polymer actuator is centered and contacted by a plurality of contact pins.

12. The slide valve of claim 1 wherein a guide element is provided which ensures a predetermined gap between said polymer actuator and said bushing.

13. The slide valve of claim 1 wherein said slide is a cylinder.

14. The slide valve of claim 1 wherein, in a portion assigned to one of said fluid openings, said fluid duct has a width in an axial direction which is smaller than a width of said fluid duct in a portion assigned to the other of said fluid openings.

15. The slide valve of claim 1 wherein an anti-twist protection is provided which ensures that said slide can be rotated with respect to said bushing by not more than a predetermined angle.

16. The slide valve of claim 15 wherein said anti-twist protection is formed by means of a rotationally fixed engagement between said slide and said polymer actuator.

17. The slide valve of claim 1 wherein said slide comprises a control portion which is provided with a fluid duct, an external diameter of said control portion substantially corresponding to an internal diameter of said bushing, and further comprises an actuator projection with diameter which is significantly smaller than said external diameter of said control portion.

18. The slide valve of claim 17 wherein a support washer is attached to said actuator projection.

19. The slide valve of claim 17 wherein said slide is provided, on a face remote from said actuator projection, with a spring projection having a diameter which is significantly smaller than said external diameter of said control portion.

20. The slide valve of claim 1 wherein said bushing is provided with at least one recess for an O ring, said recess being provided on an external surface of said bushing.

21. The slide valve of claim 1 wherein said fluid openings are slits which extend in a peripheral direction.

22. The slide valve of claim 1 wherein all components of said slide valve are non-ferromagnetic.

23. The slide valve of claim 1 wherein said bushing comprises a base formed integrally with a peripheral wall.

24. The slide valve of claim 1 wherein said bushing is sealed by an end wall.

25. The slide valve of claim 1 wherein said housing has a cover by means of which said bushing is braced inside said housing.

26. The slide valve of claim 1 wherein said polymer actuator is a dielectric elastomer actuator.

27. The slide valve of claim 1 wherein it is being formed as a 3/3-way valve or a 5/3-way valve.

* * * * *